Figure 1:
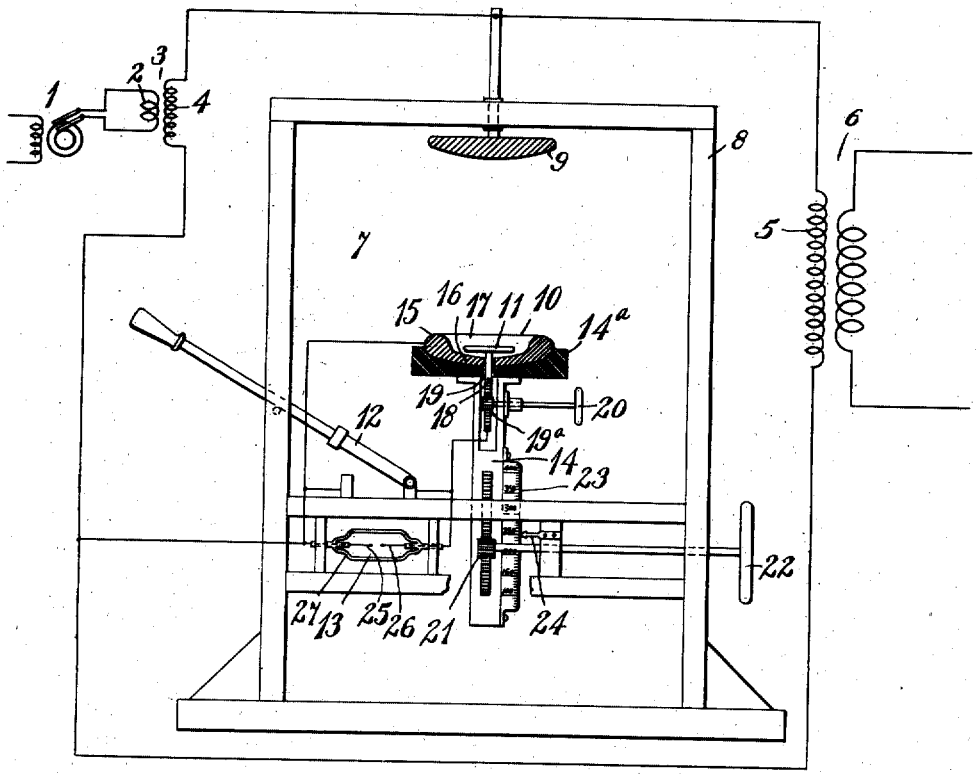

J. C. ARMOR.
HIGH POTENTIAL MEASURING DEVICE.
APPLICATION FILED FEB. 3, 1911. RENEWED APR. 30, 1915.

1,229,699.

Patented June 12, 1917.

WITNESSES:
Fred H Miller
D. W. Mace

INVENTOR
James C. Armor
BY
Wesley G. Carr
ATTORNEY

UNITED STATES PATENT OFFICE.

JAMES C. ARMOR, OF INGRAM, PENNSYLVANIA, ASSIGNOR TO WESTINGHOUSE ELECTRIC AND MANUFACTURING COMPANY, A CORPORATION OF PENNSYLVANIA.

HIGH-POTENTIAL-MEASURING DEVICE.

1,229,699.  Specification of Letters Patent.  Patented June 12, 1917.

Application filed February 3, 1911, Serial No. 606,425. Renewed April 30, 1915. Serial No. 25,078.

*To all whom it may concern:*

Be it known that I, JAMES C. ARMOR, a citizen of the United States, and a resident of Ingram, in the county of Allegheny and State of Pennsylvania, have invented a new and useful Improvement in High-Potential-Measuring Devices, of which the following is a specification.

My invention relates to means for measuring very high potentials and it has special reference to such means as are adapted to measure the maximum values of high-voltage waves.

The object of my invention is to provide a novel combination and arrangement of circuits and devices whereby accurate and reliable measurements of maximum voltages may be obtained without subjecting the system or apparatus which is being tested to any undue voltage strains or surges.

Another object of my invention is to provide a device of the above-indicated character which shall be simple and inexpensive in construction, accurate and reliable in operation, and readily adjustable for use over a wide range of voltages.

Heretofore, it has been common practice to test the insulation strength of high-voltage electrical apparatus in accordance with specifications adopted by the American Institute of Electric Engineers, in which the testing voltage is specified as that which will just cause a discharge between needle points when set a predetermined distance apart in air. The reason for prescribing the determination of testing voltages in the manner referred to, resides in the fact that the stresses set up in dielectrics that are subjected to alternating current voltages are proportional to the maximum rather than the mean effective or root-mean-square values of the voltages impressed.

The objection to this method of testing resides in the fact that when the discharge occurs between the needle points, very high potential surges are produced by reason of the oscillatory character of the discharge, and thus both the apparatus to be tested and the source of energy are subjected to abnormal and injurious potentials. Furthermore, the voltages determined by a predetermined spark gap in air are not found to be consistently uniform, but vary considerably under different conditions of test and atmospheric conditions.

Another mode employed in the past for testing dielectrics at high voltages has involved the use of an ordinary voltmeter, indicating root-mean-square values, from the readings of which the maximum or crest values of the impressed wave are determined, under the assumption that the crest values bear a definite relation to the root-mean-square values and may be obtained by multiplying the root-mean-square readings by the $\sqrt{2}$ or 1.41.

It has been found, however, that this assumption, while theoretically correct, is not strictly so under testing conditions, but departs therefrom very materially by reason of the substantial changes and distortions in the form of the testing voltage wave, which introduce exceedingly serious errors that frequently result in a variation of the constant or crest factor by as much as 25%. It is evident, therefore, that it is inaccurate and improper to rely upon this theoretical assumption and that correct results can only be obtained by actually measuring the maximum or crest values by suitable means.

It is to obviate these difficulties and to provide an improved method of measuring very high potentials that my present invention is intended.

In accordance with my invention, I provide a plurality of series-connected condensers which I connect across the source of high potential, and I arrange a suitable spark gap in multiple circuit with one of said condensers. The capacity of the condensers which is paralleled by the spark gap is large, in comparison with the combined capacity of the remaining condensers, and I have found, by experiment, that if the capacity of the large condenser be properly proportioned with respect to that of the remaining condensers, a discharge across the gap causes no undue disturbance and subjects the system and apparatus to no excessive voltage strains.

Instead of causing a discharge, it may be advisable, in some cases, to determine the impressed voltage by making careful observations of the first appearance of corona around the discharge electrodes.

In order to adapt my invention for commercial use, it is necessary to provide means for readily adjusting the apparatus to a wide range of voltages, which I accomplish either by employing a fixed gap in combination with variable capacity condensers, or by the use of fixed capacity condensers in combination with a variable discharge gap.

Uniform and reliable results are secured by inclosing the spark gap in a suitable casing, which may conveniently be of glass. Experiments have also determined that, for best operation, the vessel should contain a suitable medium, such as hydrochloric acid gas. The physical properties of this medium have been found to be undisturbed by a discharge between electrodes, and the results obtained with this arrangement of apparatus have checked with great accuracy.

Although, broadly considered, the various devices employed in my invention are, in themselves, old and familiar to those skilled in the art, it is believed that the particular arrangement and connections thereof constitute a combination which has never before been employed and that a greatly improved result is secured thereby.

Figure 2:
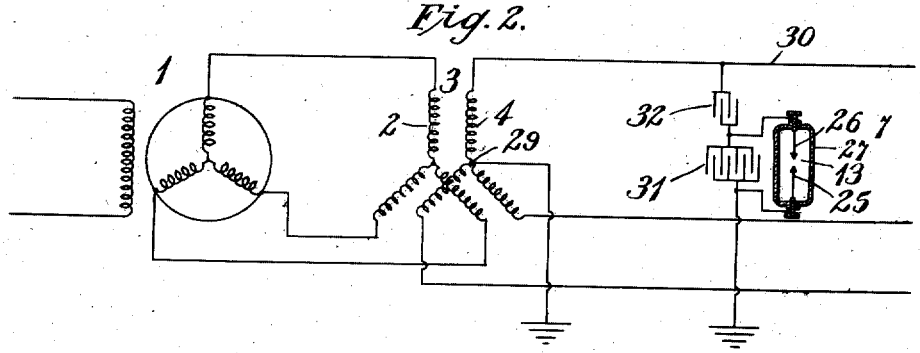

My invention may best be understood by reference to the accompanying drawings, in which Figure 1 is a schematic view of the circuit connections and structure of a high-potential measuring device which is constructed in accordance with my invention. Fig. 2 is a diagrammatic view of a system of distribution embodying my invention.

Referring to Fig. 1, an alternating current generator 1, is adapted to supply energy to a primary winding 2 of a testing transformer 3, the secondary winding 4 of which is adapted to deliver energy to a primary winding 5 of a transformer 6. The generator 1 and the transformers 3 and 6 may be of any well known type of construction and hence no detailed description is considered necessary.

A high-potential measuring device 7 is connected in parallel with the winding 5 of the transformer 6 and comprises a supporting frame 8, a stationary terminal member 9, an adjustable member 10, an auxiliary terminal member 11, a switch 12 and a discharge gap 13. The terminal member 9, which is suitably suspended from the frame 8, is of conducting material and preferably is circular in form, having a downwardly convex surface, although various other types of terminal devices may be employed. The terminal member 10 is adjustably mounted in electro-static relation to the terminal member 9 upon a supporting rod 14 which carries an insulating receiving member 14ª in which the terminal member 10 rests. As shown, the terminal member 10 constitutes a torus ring member 15 having its lower portion connected by a web 16 in such manner that a concave recess 17 is provided on its upper surface. Although I believe this type of terminal or a slight modification thereof to be the preferable form, I do not wish to be restricted in this respect, as various other terminal members may be employed for the same purpose.

The auxiliary terminal member 11 is substantially disk-like in structure and is provided with rounded edges in order to eliminate any excessive concentration of the electrostatic field. This auxiliary terminal member is centrally located within the recess 17 and is supported upon a stem 18 which passes through a central opening 19 in the terminal member 10 and is adjustable in position by means of a rack and pinion connection 19ª and a hand wheel 20.

The terminal member 10 and its associated auxiliary member 11 are adjustable with respect to the stationary terminal member 9 through the agency of a suitable rack and pinion connection 21 and a hand wheel 22. A suitable scale 23 is attached to the supporting rod 14 and may be calibrated experimentally for any desired range of voltages. An indicator 24 is provided to coöperate with the scale 23 in the usual manner.

Those skilled in the art will readily understand that a so-called air condenser is provided between the terminal members 9 and 10, the capactiy of which may be varied at will by varying the distance between them. Furthermore, the terminal members 10 and 11 constitute a similar air condenser, the capacity of which may also be readily adjusted in accordance with the same well known principles.

The switch 12 is of a common type of construction and its opposite poles are connected, respectively, to the terminal members 10 and 11. The switch 12 is only illustrative of a suitable device for short circuiting the condenser formed between the terminal members 10 and 11.

The discharge gap 13 comprises a plurality of electrodes 25 and 26 which are sealed into a glass receptacle 27 at a fixed distance apart. In order to obtain uniformity of results, I inclose a suitable medium, such as hydrochloric acid gas within the receptacle 27, as hereinbefore pointed out.

I have found, by experiment, that, when hydrogen or nitrogen is employed with a fixed gap, the voltages which are necessary to cause a discharge decrease with successive discharges. The opposite is true of air and carbon dioxid, while, with hydrochloric acid gas, the conditions are apparently constant and great reliability is attained. Although I find hydrochloric acid gas particularly useful in this connection, there are various other gases which may be employed to accomplish the same results.

For ready use in commercial service, the measuring device 7 should be experimentally calibrated for the range of voltages desired, and, although it is not strictly accurate to calibrate a device of this character by means of the known ratio of transformation of a given transformer, such a method is sufficiently reliable for illustrative purposes.

Assuming that it is desired to calibrate the device for a scale between 100 kilo-volts and 400 kilo-volts, it is necessary to experimentally adjust the auxiliary terminal member 11 with respect to the terminal member 10 until the desired range of voltage readings, as determined by the known ratio of the testing transformer, may be obtained by raising and lowering the terminal member 10 with respect to its coöperating terminal member 9. Having determined the proper position of the auxiliary terminal member 11 for the desired range of voltage, it is fixed in position and the scale 23 is calibrated experimentally, in the usual manner, by applications of a known voltage and corresponding adjustments of the terminal member 10.

Assuming the device to have been previously calibrated and that it is desired to apply a test voltage of 250 kilo-volts, for example, to the transformer 6, the operation is as follows:

The terminal member 10 is first adjusted by means of the hand wheel 22 until the indicator 24 registers the desired voltage, as shown. The voltage of the generator 1 is then gradually increased until the voltage across the spark gap 13 causes a discharge, thereby indicating that the desired voltage is impressed upon the transformer 6.

Although I have hereinbefore shown and described a device having a fixed spark gap and variable-capacity condensers, it is evident that successful results may be obtained through the use of fixed-capacity condensers and a variable spark gap. Such an arrangement I have shown in Fig. 2 to which reference may now be made.

An alternating current generator 1 is adapted to supply energy to primary windings 2 of a transformer 3, the secondary winding 4 being adapted to deliver energy to a distribution system (not shown). The neutral point 29 of the secondary windings 4 is grounded and a measuring device 7, constructed in accordance with my invention, is connected between a conductor 30 and the ground. With this arrangement, it is possible to measure the maximum values of the distribution potential under varying conditions, as will be readily understood.

The measuring device 7 herein shown comprises two condensers 31 and 32 which are connected in series between the conductor 30 and the ground. The capacity of both condensers is fixed and that of condenser 32 is small in comparison with that of condenser 31. The spark gap 13 is in multiple circuit with the larger condenser and the electrodes 25 and 26 are adjustably mounted in position in a well known manner. A suitable receptacle 27 incloses the electrodes and is filled with a suitable medium, as hereinbefore pointed out.

This type of measuring device is experimentally calibrated in any familiar manner for the range of voltages desired and a calibrated scale (not shown) is provided to correspond to varying lengths of discharge gap.

If it is desired to measure the potential between the conductor 30 and the ground, the measuring device is connected as shown, with the electrodes 25 and 26 in their extreme positions. The electrodes are then gradually brought together until a discharge is effected across the gap which is an indication that the voltage registered upon the scale is that which exists upon the line.

Although I have shown and described a specific arrangement of apparatus and circuit connections, those skilled in the art will readily understand that various modifications in the size and arrangement and location of parts may be effected without exceeding the scope of my invention, and I desire that only such limitations shall be imposed as are indicated in the appended claims.

I claim as my invention:

1. The combination with a source of electrical energy and a plurality of condensers connected in series across said source, of a spark gap device connected in parallel relation to one of said condensers to indicate when the voltage of said source has a predetermined maximum value.

2. The combination with a source of high-potential electrical energy and two relatively variable condensers of widely different capacities connected in series across said source, of a discharge gap device connected in parallel with the condenser of larger capacity for indicating when the source of potential has a predetermined maximum value.

3. The combination with a source of high-potential electrical energy, of means for determining when the potential thereof has reached a predetermined maximum value comprising a condenser of variable capacity, a second condenser of relatively large capacity connected in series therewith, and a spark gap device at which discharges may occur, connected in multiple circuit with said larger condenser.

4. A high-potential measuring device comprising a stationary terminal member, a coöperating adjustable terminal member in electro-static relation therewith, an auxiliary terminal member adjustably related to said adjustable member, and a discharge gap device electrically connected to said adjustable terminal members.

5. A high-potential measuring device comprising coöperating and relatively adjustable terminal members in electro-static relation, an auxiliary terminal member adjustably associated with one of said terminal members, and a spark gap device connected to said auxiliary terminal member and to the terminal member with which it is associated.

6. A high-potential measuring device comprising a supporting frame, a terminal member suspended therefrom, a second terminal member arranged in electrostatic relation to said first terminal member and adjustably mounted in said supporting frame, a third terminal member adjustably disposed in electrostatic relation to said second terminal member, a spark gap device connected to said second and third terminal members, and means for enveloping said spark gap device in a suitable medium.

7. A high-potential measuring device comprising a plurality of series-connected condensers, one of which is variable in capacity, of a spark gap device connected in parallel with one of said condensers, and a vessel containing a gas having fixed physical properties surrounding said spark gap device.

8. The combination with a source of high-potential electrical energy and two condensers of widely different capacities connected in series across said source, of a discharge gap device connected in parallel with the larger condenser.

9. The combination with a supporting frame, a circular terminal member having a downwardly convex surface, a second circular terminal member having an upwardly concave surface, said second member being adjustably mounted in said supporting frame and in electrostatic relation to said first terminal member, and a disk-like terminal member adjustably disposed above the concave surface of said second member and in electrostatic relation thereto, of a single spark gap device connected to said second terminal member and said disk-like terminal member, and a glass vessel containing a suitable gas surrounding said spark gap device.

10. The combination with a source of high-potential electric energy and two condensers of widely different capacities connected in series across said source, of a discharge gap device connected in parallel with the larger of said condensers, and a vessel surrounding said device and containing a suitable gas.

11. The combination with a supporting frame, a fixed terminal and a movable terminal in electro-static relation therewith, of means for adjusting the position of said movable terminal and a coöperating graduated scale and pointer associated with said movable terminal and said frame.

12. The combination with a supporting frame, a plurality of relatively movable terminals arranged in electro-static relation, of mechanical means for adjusting the position of the movable terminal, a graduated scale associated with the movable terminal and a pointer associated with the frame.

13. A device for determining the maximum value of the voltage of an electric circuit comprising a plurality of condensers connected in series across the said circuit and means connected to one of the condensers for indicating when the circuit voltage has a predetermined maximum value.

14. A device for determining the maximum value of the voltage of an electric circuit comprising two condensers of different capacitance connected in series across the said circuit and means coöperating with one of the condensers for indicating when the circuit voltage has a predetermined maximum value.

15. A device for determining the maximum value of the voltage of an electric circuit comprising a plurality of condensers connected in series across the said circuit and means connected in parallel relation to one of the condensers for indicating when the circuit voltage has a predetermined maximum value.

In testimony whereof, I have hereunto subscribed my name this 28th day of Jan. 1911.

JAMES C. ARMOR.

Witnesses:
H. H. GALLEHER,
B. B. HINES.